US009461550B2

(12) United States Patent
Fornage (10) Patent No.: US 9,461,550 B2
(45) Date of Patent: *Oct. 4, 2016

(54) METHOD AND APPARATUS FOR EXTENDING ZERO-VOLTAGE SWITCHING RANGE IN A DC TO DC CONVERTER (71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

(*) Notice: Subject to any disclaimer, the term of this patent is extended or adjusted under 35 U.S.C. 154(b) by 87 days.

This patent is subject to a terminal disclaimer.

(21) Appl. No.: 14/492,936

(22) Filed: Sep. 22, 2014

(65) Prior Publication Data
US 2015/0009718 A1    Jan. 8, 2015

Related U.S. Application Data (63) Continuation of application No. 12/383,497, filed on Mar. 25, 2009, now Pat. No. 8,873,252.

(60) Provisional application No. 61/070,799, filed on Mar. 26, 2008.

(51) Int. Cl.
*H02M 3/335* (2006.01)
*H02M 7/48* (2007.01)
*H02M 7/42* (2006.01)

(52) U.S. Cl.
CPC ......... *H02M 3/33507* (2013.01); *H02M 3/335* (2013.01); *H02M 7/42* (2013.01); *H02M 7/4807* (2013.01); *H02M 2007/4815* (2013.01); *Y02B 70/1433* (2013.01); *Y02B 70/1441* (2013.01)

(58) Field of Classification Search
CPC ........... H02M 3/335; H02M 3/33507; H02M 3/33515; H02M 3/33523; H02M 3/33538; H02M 3/33546; H02M 3/33553; H02M 3/33569; H02M 3/33576
See application file for complete search history.

(56) References Cited

U.S. PATENT DOCUMENTS 3,516,000 A   6/1970   Slechia
3,713,014 A   1/1973   Wagner
(Continued)

FOREIGN PATENT DOCUMENTS

JP   S63253866 A   10/1988
JP   H04262 A     1/1992
(Continued)

OTHER PUBLICATIONS

Tabisz et al., "Zero-Voltage-Switching Multi-Resonant Technique—A Novel Approach to Improve Performance of High Frequency Quasi-Resonant Converters", Power Electronics Specialists Conference, 1988. PESC '88 Record., 19th Annual IEEE, vol. 1, pp. 9-17, Apr. 1988.

(Continued)

*Primary Examiner* — Jeffrey Gblende
(74) *Attorney, Agent, or Firm* — Moser Taboada (57) ABSTRACT Method and apparatus for extending a zero voltage switching (ZVS) range during power conversion. In one embodiment, the apparatus comprises a DC/DC converter, operated in a quasi-resonant mode, comprising a transformer; a primary switch, coupled to a primary winding of the transformer, for controlling current flow through the primary winding; and a component coupled to the transformer, wherein the component has a capacitance that varies with voltage across the component, and wherein during a downswing in voltage across the primary switch the component is passively tuned by a change in the voltage across the component that changes the capacitance of the component, and wherein the passive tuning of the component causes a resonant frequency of the DC/DC converter to change, and wherein the change in the resonant frequency causes the downswing to accelerate.

20 Claims, 4 Drawing Sheets (56) References Cited

U.S. PATENT DOCUMENTS

| | | | |
|---|---|---|---|
| 3,829,866 A * | 8/1974 | Nobusawa | G02B 7/36 356/226 |
| 3,835,406 A * | 9/1974 | Thompson | H03F 1/14 330/107 |
| 4,059,791 A | 11/1977 | Serizawa et al. | |
| 4,334,324 A | 6/1982 | Hoover | |
| 5,020,146 A | 5/1991 | Pugel | |
| 5,258,997 A | 11/1993 | Fraser et al. | |
| 5,285,179 A * | 2/1994 | Wignot | H03J 3/26 333/25 |
| 5,339,048 A * | 8/1994 | Weber | H03F 3/193 330/302 |
| 5,386,359 A | 1/1995 | Nochi | |
| 5,517,179 A | 5/1996 | Charlot, Jr. | |
| 5,708,573 A | 1/1998 | Lusher et al. | |
| 6,078,510 A | 6/2000 | Spampinato et al. | |
| 6,330,170 B1 | 12/2001 | Wang et al. | |
| 6,566,963 B1 * | 5/2003 | Yan | H03F 1/22 330/283 |
| 7,619,457 B1 | 11/2009 | Mai | |
| 2006/0055457 A1 | 3/2006 | Takaso et al. | |

FOREIGN PATENT DOCUMENTS

| | | |
|---|---|---|
| JP | 6350375 A | 12/1994 |
| JP | 200797379 A | 4/2007 |
| JP | 2007124732 A | 5/2007 |
| WO | WO-2009118683 A2 | 10/2009 |

OTHER PUBLICATIONS

Liu et al. "Zero-Voltage Switching Technique in DC/DC Converters", Power Electronics, IEEE Transactions on, vol. 5, Issue 3, Jul. 1990.

"Inverters, Converters, Controllers and interconnection system equipment for use with distributed energy resources", Underwriters Laboratories Inc., UL Standard 1741.1, May 7, 1999. http://ulstandardsinfonet.ul.com/scopes/1741.html.

Wong et al., "A Wide Tuning Range Gated Varactor", Solid-State Circuits, IEEE Journal of vol. 35, Issue 5, pp. 773-779, May 2000.

Basso, "A 30W Power Supply Operating in Quasi-Square Wave Resonant Mode", Semiconductor components Industries, LLC, pp. 1-18, 2003.

"IEEE Standard for Interconnecting Distributed Resources With Electric Resources With Electric Power Systems", Copyright 2003 by the Institute of Electrical and Electronics Engineers, Inc, Jul. 28, 2003.

Upadhyaya et al., "A high power density 1.75 mm2 fully integrated closed-loop buck converter with Varactor control scheme", Applied Power Electronics Conference and Exposition, 2008. APEC 2008. Twenty-Third Annual IEEE, pp. 31-35, Feb. 2008.

International Search Report and Written Opinion Mailed on Nov. 5, 2009 for Application No. PCT/US2009/038270, 8 Pages.

Korean Office Action Dated May 29, 2012 for Application No. 10-2010-7023217, 4 Pages.

Examiner's Report Dated Jul. 13, 2012 for Canadian Application No. 2,719,002 4 Pages.

* cited by examiner

METHOD AND APPARATUS FOR EXTENDING ZERO-VOLTAGE SWITCHING RANGE IN A DC TO DC CONVERTER

CROSS-REFERENCE TO RELATED APPLICATIONS

This application is a continuation of co-pending U.S. non-provisional patent application Ser. No. 12/383,497 filed Mar. 25, 2009, which claims benefit of U.S. provisional patent application Ser. No. 61/070,799, entitled "Apparatus for Extending Zero-Voltage Switching Range in a DC to DC Converter", filed Mar. 26, 2008, both of which are herein incorporated in their entirety by reference.

BACKGROUND OF THE INVENTION

1. Field of the Invention

Embodiments of the present invention generally relate to power conversion and, more particularly, to an apparatus for extending the zero-voltage switching (ZVS) range in a DC/DC converter.

2. Description of the Related Art

A common topology for DC/DC converters is to operate a flyback converter in a quasi-resonant mode, where the primary switch is activated at the valley of the drain voltage (i.e., a minimum point in the drain-source voltage). The quasi-resonant flyback is a variation of the hard switched flyback, which utilizes the parasitic capacitance of the switch, or even an added capacitance, to absorb leakage inductance energy resulting from a leakage inductance of the DC/DC converter transformer. In addition, by adequately choosing the activation time of the switch, it is possible to have a zero-voltage switching (ZVS) activation characteristic, as well as ZVS deactivation characteristic, in order to improve overall efficiency.

One issue with such an approach is that a true ZVS transition only occurs in a limited input voltage range and cannot be achieved for all operating conditions. For example, the secondary reflected voltage has to be higher than the input voltage to have a ZVS activation. If such conditions are not met, the energy stored in the capacitance around the primary switch is wasted as the voltage across the primary switch is re-set when the switch turns on, leading to a significant loss of efficiency.

Therefore, there is a need in the art for the ability to extend the ZVS range in DC/DC converters.

SUMMARY OF THE INVENTION

Embodiments of the present invention generally relate to a method and apparatus for extending a zero voltage switching (ZVS) range during power conversion. In one embodiment, the apparatus comprises a DC/DC converter, operated in a quasi-resonant mode, comprising a transformer; a primary switch, coupled to a primary winding of the transformer, for controlling current flow through the primary winding; and a component coupled to the transformer, wherein the component has a capacitance that varies with voltage, and wherein during a downswing in voltage across the primary switch the component is passively tuned by a change in voltage across the component that changes the capacitance of the component, and wherein the passive tuning of the component causes a resonant frequency of the DC/DC converter to change, and wherein the change in the resonant frequency causes the downswing to accelerate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only a typical embodiment of this invention and are therefore not to be considered limiting of its scope, for the invention may admit to other equally effective embodiments.

DETAILED DESCRIPTION

Figure 1:
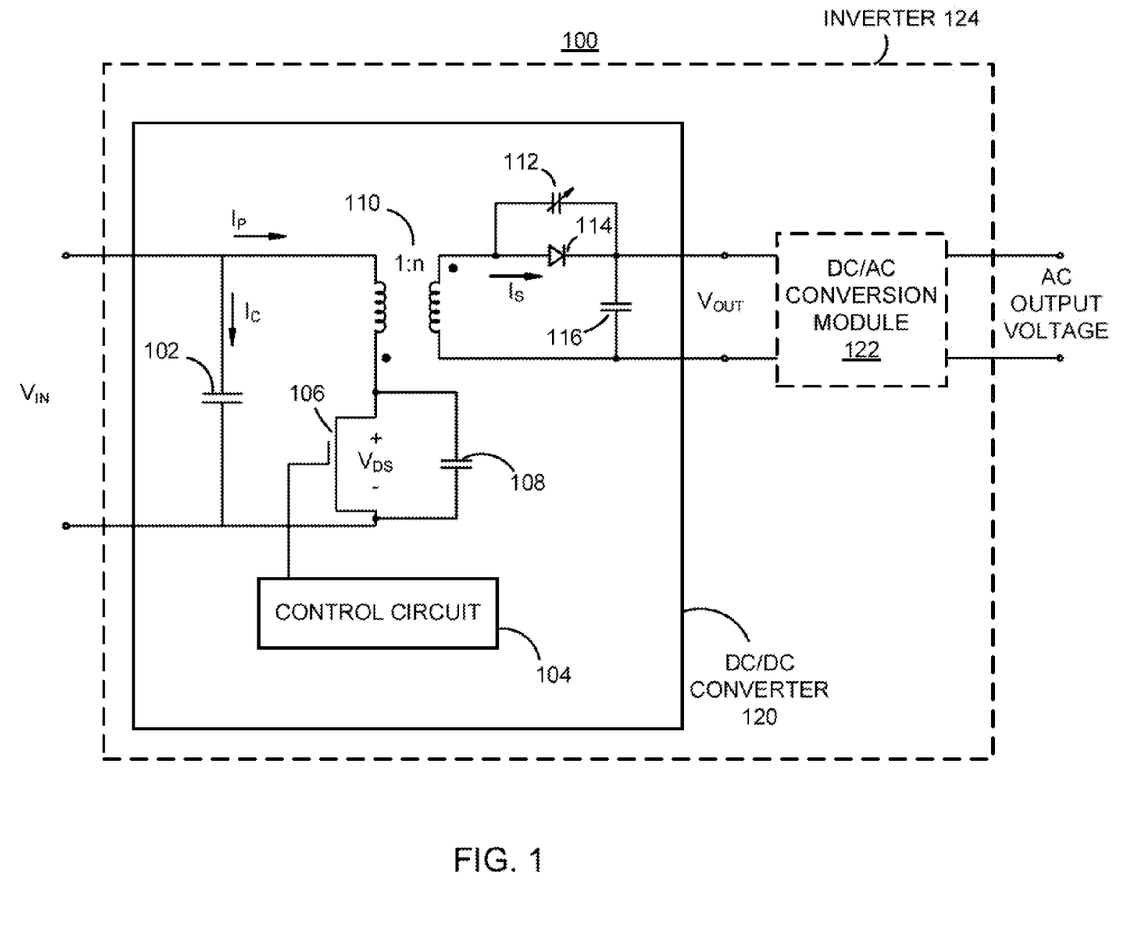
FIG. 1 is a schematic diagram of a DC/DC converter in accordance with one or more embodiments of the present invention.

FIG. 1 is a schematic diagram of a DC/DC converter 120 in accordance with one or more embodiments of the present invention. In some embodiments, the DC/DC converter 120 may be a flyback converter operated in a quasi-resonant mode; alternative embodiments may comprise different types of DC/DC converters, such as a buck converter, a boost converter, a buck-boost converter, and the like, operated in a quasi-resonant mode. The DC/DC converter 120 may be employed in a stand-alone configuration for DC/DC power conversion, or may be utilized with or as a component of other power conversion devices, such as a DC/AC inverter 124 as shown in FIG. 1. The DC/AC inverter 124 additionally comprises a DC/AC conversion module 122, coupled to the DC/DC converter 120, for converting an output voltage from the DC/DC converter 120 to an AC output voltage. The DC/AC inverter 124 may be utilized in the conversion of DC power, generated by one or more distributed generators (DGs) such as solar power systems, to AC power.

The DC/DC converter 120 comprises a capacitor 102 coupled across two input terminals of the DC/DC converter 120 for receiving an input voltage, $V_{in}$. The capacitor 102 is further coupled across a series combination of a primary winding of a transformer 110 and a semiconductor switch 106 ("primary switch"). The primary switch 106 may comprise one or more switches known in the art, such as metal-oxide-semiconductor field-effect transistors (MOSFETs), bipolar junction transistors (BJTs), emitter switched bipolar transistors (ESBTs), and the like. In some embodiments, a capacitor 108 is coupled across drain and source terminals of the primary switch 106; alternatively, the capacitor 108 is not physically coupled across the primary switch 106 but represents parasitic capacitances present at the node, for example capacitances of the semiconductor primary switch 106, printed circuit board (PCB) capacitances, stray capacitances, and the like.

A secondary winding of the transformer 110, having a 1:n turns ratio, is coupled across a series combination of a diode 114 and an output capacitor 116, with an anode terminal of the diode 114 being coupled to a first terminal of the secondary winding. Two output terminals of the DC/DC converter 120 are coupled across the output capacitor 116 for providing an output voltage, $V_{out}$.

In accordance with one or more embodiments of the present invention, a varactor 112 (i.e., a voltage variable capacitor) is coupled across the diode 114; alternatively, the varactor 112 may replace the diode 114. In some embodiments, the varactor 112 has a junction capacitance $C_{var}$ as follows:

$$C_{var} < C_0 * \left(1 - \frac{V_{var}}{V_j}\right)^M \quad (1)$$

where $V_{var}$ is the varactor voltage and $C_0$, $V_j$, and M are coefficients dependent upon the specific varactor employed. The varactor 112 may be comprised of diodes, MOSFETS, BJTs, ceramic capacitors, and the like.

The DC/DC converter 120 receives the input voltage $V_{in}$ and converts the input voltage to the output voltage $V_{out}$. During such conversion, a current $I_c$ flows through the capacitor 102 and a current $I_p$ ("primary current") is supplied to the primary winding of the transformer 110 in accordance with the timing (i.e., opening and closing) of the primary switch 106, as driven by a control circuit 104 coupled to a gate terminal of the primary switch 106. When the primary switch 106 is open, no current flows through the primary winding of the transformer 110 (i.e., $I_p=0$) and the current $I_c$ charges the capacitor 102. When the primary switch 106 is closed, the capacitor 102 discharges and the primary current $I_p$ increases linearly through the primary winding of the transformer 110. The primary current $I_p$ additionally flows through a leakage inductance of the transformer 110 that is effectively in series with the primary winding.

When the primary switch 106 opens, the flow of the primary current $I_p$ through the primary switch 106 ceases and the leakage inductance reverses its voltage, causing a rapid rise of a drain-source voltage $V_{ds}$ across the primary switch 106 until the threshold voltage of the diode 114 is reached and the diode 114 begins to conduct. As a result of the energy stored in the magnetic field of the transformer 110, a current $I_s \sim I_p/n$ ("secondary current") is induced in the secondary winding and linearly declines to zero. As the secondary current $I_s$ reaches zero, a core reset period begins and the drain-source voltage $V_{ds}$ begins to ring sinusoidally at a frequency of an LC resonant circuit seen from the primary side comprising the inductance of the primary winding, the capacitance of the capacitor 108, and the reflected capacitance from the varactor 112, where the ringing is damped by ohmic losses.

At the time the secondary current $I_s$ reaches zero, the capacitance of the varactor 112 is large (i.e., approximately $C_0$) due to a varactor voltage $V_{var}$ close to zero. As the drain-source voltage $V_{ds}$ begins to swing down, the varactor voltage $V_{var}$ increases. The rising varactor voltage $V_{var}$ reduces the varactor capacitance $C_{var}$, thereby increasing the frequency of the LC resonant circuit during the downward swing of the drain-source voltage $V_{ds}$ and thus accelerating the downward swing of the drain-source voltage $V_{ds}$. The accelerated drain-source voltage downswing extends the zero voltage switching (ZVS) range by creating a deeper valley in the drain-source voltage $V_{ds}$ for the ZVS switching to occur. Thus, the primary switch 106 can be activated at a $V_{ds}$ closer to zero than that which would be possible without the effect of the varactor 112. In some embodiments, the ZVS range may experience at least a 30% increase.

Figure 2:
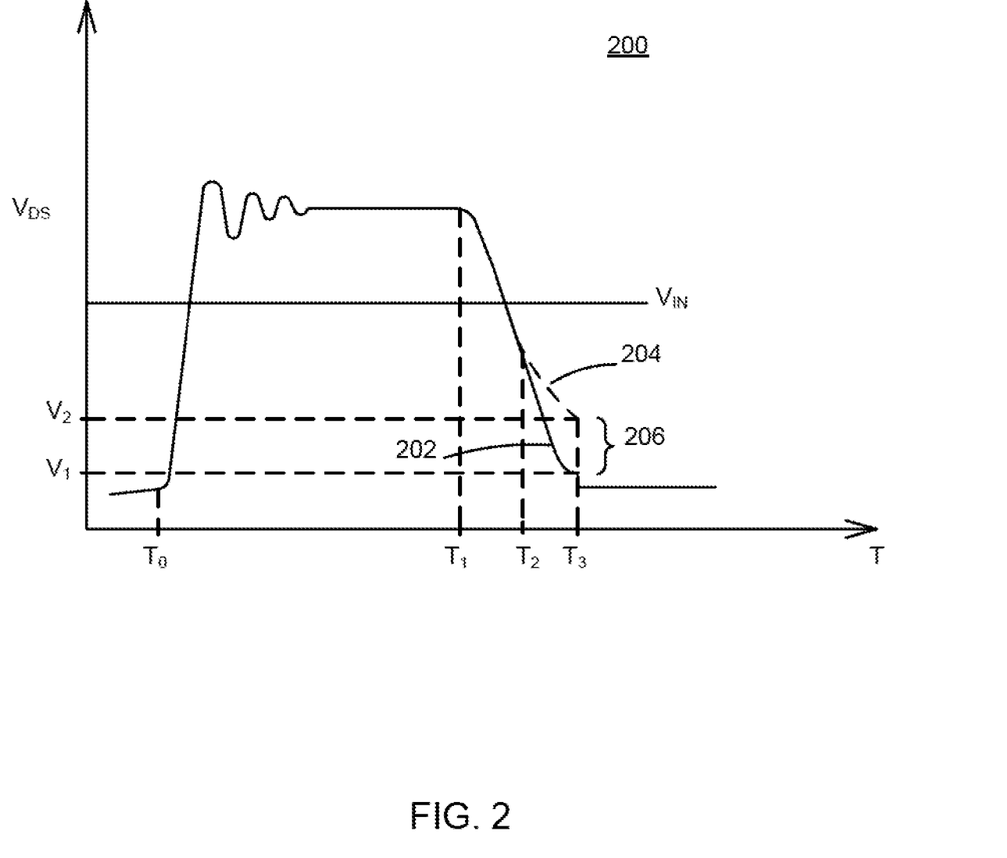
FIG. 2 is a graphical diagram of a drain-source voltage $V_{ds}$ across a primary switch in accordance with one or more embodiments of the present invention.

FIG. 2 is a graphical diagram of a drain-source voltage $V_{ds}$ across a primary switch 106 in accordance with one or more embodiments of the present invention. The primary switch 106 operates within the DC/DC converter 120 as previously described with respect to FIG. 1. Prior to $T_0$, the primary switch 106 is closed and current flows through the primary switch 106. At time $T_0$, the primary switch 106 opens (i.e., turns off), thereby terminating the flow of current through the primary switch 106. Additionally, the leakage inductance of the transformer 110 reverses its voltage, causing a rapid rise of the drain-source voltage $V_{ds}$. Once the threshold voltage of the diode 114 is reached, the diode 114 begins to conduct and a secondary current $I_s \sim I_p/n$ is induced in the secondary winding and linearly declines to zero.

At time $T_1$, the secondary current $I_s$ reaches zero and the varactor voltage $V_{var}$ is close to zero, resulting in a large capacitance of the varactor 112 (i.e., approximately $C_0$). A core reset period begins, and the drain-source voltage $V_{ds}$ begins to ring at the frequency of the LC resonant circuit.

From time $T_1$ to $T_2$, as the drain-source voltage $V_{ds}$ begins to decline, the varactor voltage $V_{var}$ rises and reduces the varactor capacitance $C_{var}$, thereby increasing the resonant frequency of the LC resonant circuit during the downward swing of the drain-source voltage $V_{ds}$. From time $T_2$ to $T_3$, the increased resonant frequency accelerates the downward swing of $V_{ds}$, resulting in a $V_{ds}$ downswing 202 that is more rapid than a $V_{ds}$ downswing 204 that would occur when the resonant frequency of the LC circuit remains unchanged (i.e., in the absence of the varactor 112).

The accelerated $V_{ds}$ downswing 202 results in a lower valley in the drain-source voltage $V_{ds}$ at time $T_3$ than a valley which would occur in the absence of the varactor 112, thus creating an extended ZVS range 206. The extended ZVS range 206 allows the primary switch 106 to be activated at a lower drain-source voltage $V_{ds}$ (i.e., $V_1$) than that which would be possible without the effect of the varactor 112 (i.e., $V_2$), resulting in an energy savings of $\frac{1}{2}C^*(V_2-V_1)^2$, where C is the capacitance of the capacitor 108.

Figure 3:
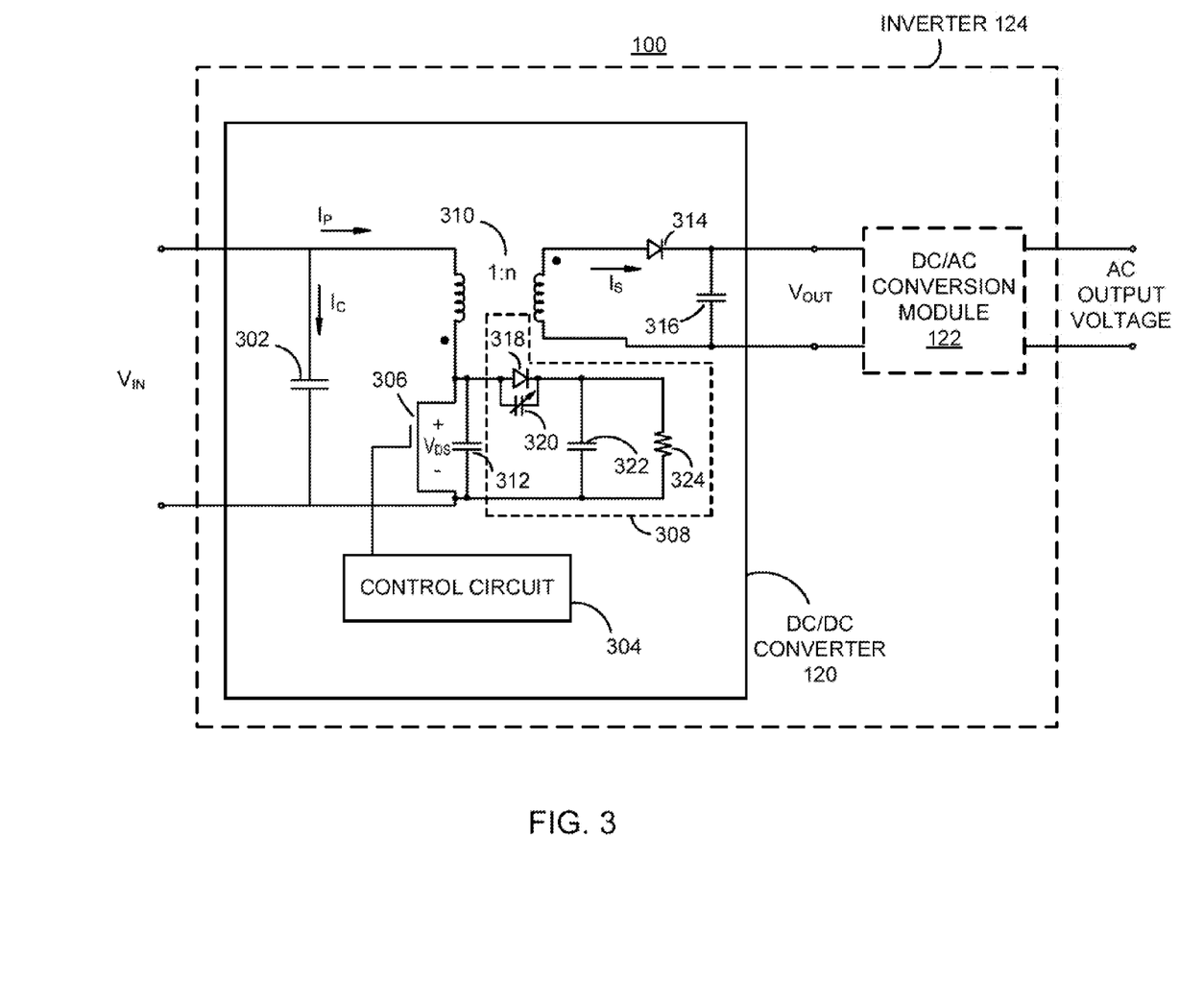
FIG. 3 is a schematic diagram of a DC/DC converter in accordance with one or more embodiments of the present invention.

FIG. 3 is a schematic diagram of a DC/DC converter 120 in accordance with one or more embodiments of the present invention. In some embodiments, the DC/DC converter 120 may be a flyback converter operated in a quasi-resonant mode; alternatively, the DC/DC converter 120 may be a buck converter, a boost converter, a buck-boost converter, or similar type of DC/DC converter. The DC/DC converter 120 may be employed in a stand-alone configuration for DC/DC power conversion, or may be utilized with or as a component of other power conversion devices, such as the DC/AC inverter 124 as shown in FIG. 3. Additionally, as previously described, the DC/AC inverter 124 comprises a DC/AC conversion module 122, coupled to the DC/DC converter 120, for converting an output voltage from the DC/DC converter 120 to an AC output voltage. The DC/AC inverter 124 may be utilized in the conversion of DC power, generated by one or more distributed generators (DGs) such as solar power systems, to AC power.

The DC/DC converter 120 comprises a capacitor 302 coupled across two input terminals of the DC/DC converter 120 for receiving an input voltage, $V_{in}$. The capacitor 302 is further coupled across a series combination of a primary winding of a transformer 310 and a semiconductor switch 306 ("primary switch"). The primary switch 306 may comprise one or more switches known in the art, such as metal-oxide-semiconductor field-effect transistors (MOSFETs), bipolar junction transistors (BJTs), emitter switched bipolar transistors (ESBTs), and the like. A voltage clamp circuit 308, comprising a diode 318, a varactor 320, a capacitor 322, and a resistor 324, is coupled across the primary switch 306 for controlling a spike in the drain-source voltage created by leakage inductance energy from the transformer 310, as further described below. Additionally, a capacitor 312 is shown coupled across the primary switch 306 to represent parasitic capacitances present at the node, such as capacitances of the semiconductor primary switch 306, PCB capacitances, stray capacitances, and the like.

An anode terminal of the diode 318 and a first terminal of the varactor 320 are coupled to a drain terminal of the primary switch 306; a cathode terminal of the diode 318 and a second terminal of the varactor 320 are coupled to a first terminal of the capacitor 322 and a first terminal of the resistor 324. A second terminal of the capacitor 322 and a second terminal of the resistor 324 are coupled to a source terminal of the primary switch 306. In some embodiments, the varactor 320 has a junction capacitance $C_{var}$ as follows:

$$C_{var} < C_0 * \left(1 - \frac{V_{var}}{V_j}\right)^M \quad (2)$$

where $V_{var}$ is the varactor voltage and $C_0$, $V_j$ and M are coefficients dependent upon the specific varactor employed. The varactor 320 may be comprised of diodes, MOSFETS, BJTs, ceramic capacitors, and the like. In one or more alternative embodiments, the varactor 320 may replace the diode 318.

A secondary winding of the transformer 310, having a 1:n turns ratio, is coupled across a series combination of a diode 314 and an output capacitor 316, with an anode terminal of the diode 314 being coupled to a first terminal of the secondary winding; in some embodiments, the transformer ratio may be below one (i.e., a step-down transformer). Two output terminals of the DC/DC converter 120 are coupled across the output capacitor 316 for providing an output voltage, $V_{out}$.

Analogous to the operation previously described, the DC/DC converter 120 receives the input voltage $V_{in}$ and converts the input voltage to the output voltage $V_{out}$. During such conversion, a current $I_c$ flows through the capacitor 302 and a primary current $I_p$ is supplied to the primary winding of the transformer 310 in accordance with the timing (i.e., opening and closing) of the primary switch 306, as driven by a control circuit 304 coupled to a gate terminal of the primary switch 306. When the primary switch 306 is open, no current flows through the primary winding of the transformer 310 (i.e., $I_p$=0) and the current $I_c$ charges the capacitor 302. When the primary switch 306 is closed, the capacitor 302 discharges and the primary current $I_p$ increases linearly through the primary winding of the transformer 310. The primary current $I_p$ additionally flows through a leakage inductance of the transformer 310 that is effectively in series with the primary winding.

When the primary switch 306 opens, the flow of the primary current $I_p$ through the primary switch 306 ceases and the leakage inductance reverses its voltage, causing a rapid rise of the drain-source voltage $V_{ds}$ that results in a spike well over the reflected voltage of $V_{out}/n$. The resistor 324, capacitor 322, and diode 318 act as an RCD (resistor/capacitor/diode) clamp to limit such a spike and prevent damage to the primary switch 306.

As the drain-source voltage $V_{ds}$ increases following the opening of the primary switch 306, the voltage across the diode 314 increases until the threshold voltage is reached and the diode 314 begins to conduct. As a result of the energy stored in the magnetic field of the transformer 310, a secondary current $I_s$~$I_p$/n is induced in the secondary winding and linearly declines to zero. Analogous to the operation previously described with respect to FIG. 1, when the secondary current $I_s$ reaches zero the drain-source voltage $V_{ds}$ begins ringing sinusoidally due to an LC resonant circuit seen on the primary side comprising a capacitive component from the varactor 320, where the ringing is damped by ohmic losses. As the drain-source voltage $V_{ds}$ falls, the varactor voltage $V_{var}$ increases and reduces the varactor capacitance $C_{var}$. The decreasing varactor capacitance $C_{var}$ increases the frequency of the LC resonant circuit during the downward swing of the drain-source voltage $V_{ds}$, resulting in an accelerated downswing of the drain-source voltage $V_{ds}$. Such an accelerated downswing extends the ZVS range by creating a deeper valley for the ZVS switching to occur. In some embodiments, the ZVS range may experience at least a 30% increase.

Figure 4:
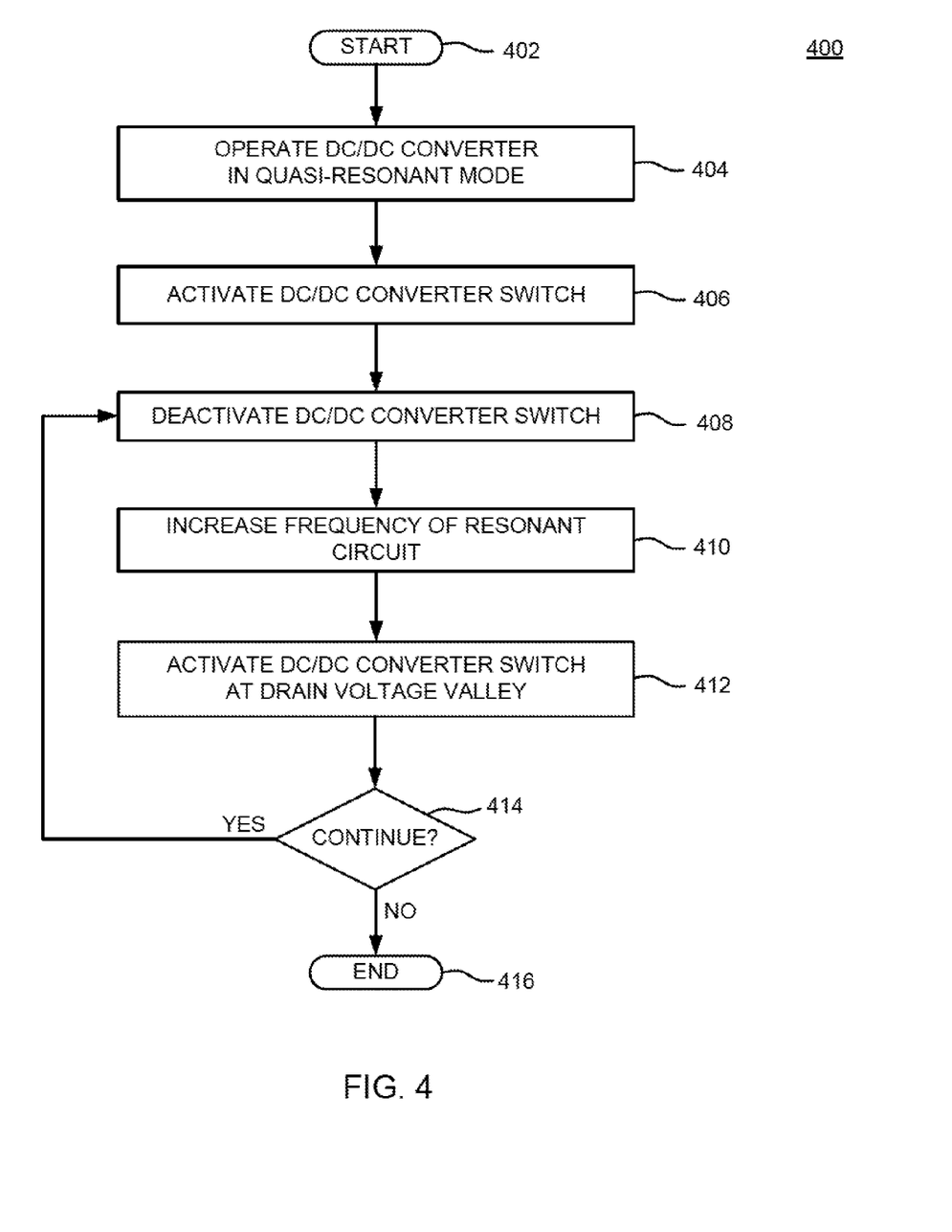
FIG. 4 is a flow diagram of a method for increasing a zero voltage switching (ZVS) range in accordance with one or more embodiments of the present invention.

FIG. 4 is a flow diagram of a method 400 for extending a zero voltage switching (ZVS) range in accordance with one or more embodiments of the present invention. The method 400 begins at step 402 and proceeds to step 404. At step 404, a DC/DC converter is operated in a quasi-resonant mode. The DC/DC converter comprises a transformer having a 1:n turns ratio and may be a flyback converter, a buck converter, a boost converter, a buck-boost converter, or similar type of DC/DC converter. In some embodiments, the DC/DC converter may be utilized in a stand-alone configuration for DC/DC power conversion; alternatively, the DC/DC converter may be utilized with or as a component of other power conversion devices, such as a DC/AC inverter 124. Such a DC/AC inverter may be utilized in the conversion of DC power, generated by one or more distributed generators (DGs) such as solar power systems, to AC power.

At step 406, a switch ("primary switch") of the DC/DC converter, coupled in series with a primary winding of the transformer, is activated for generating a current ("primary current") through the primary winding, and the primary current linearly increases. At step 408, the primary switch is deactivated and the primary current ceases. Due to a leakage inductance of the primary winding, a drain-source voltage across the primary switch rapidly increases until a diode coupled to the transformer secondary winding is activated and a current ("secondary current") is induced in the secondary winding. In some embodiments, a spike in the drain-source voltage during such a rapid increase is limited by a voltage clamp circuit coupled to the primary winding.

The secondary current linearly declines to zero. Once the secondary current reaches zero, the drain-source voltage begins ringing sinusoidally due to an LC resonant circuit of the DC/DC converter, where the ringing is damped by ohmic losses. The method 400 proceeds to step 410.

At step 410, the frequency of the LC resonant circuit is increased during the downward swing of the ringing drain-source voltage, for example by decreasing a capacitance of the LC resonant circuit during this time. In some embodiments, a varactor having a junction capacitance that decreases as the corresponding varactor voltage increases may be utilized to provide a capacitive component of the LC resonant circuit, where the varactor voltage is increased as the drain-source voltage decreases. Such a varactor may be coupled to the secondary winding of the transformer; alternatively, the varactor may be part of the voltage clamp circuit coupled to the primary winding. The increased resonant frequency accelerates the downward swing of the drain-source voltage, creating a deeper valley (i.e., an extended ZVS range) for switching to occur.

At step 412, the primary switch is activated at a valley of the drain-source voltage, and a primary current flows through the primary winding as previously described. In some embodiments, the primary switch may be activated at the first valley of the ringing drain-source voltage; alternatively, the primary switch may be activated at a subsequent valley. The method 400 proceeds to step 414, where a decision is made whether to continue operation of the DC/DC converter. If the result of such decision is yes, the method 400 returns to step 408; if the result of such decision is no, the method 400 proceeds to step 416 where it ends.

While the foregoing is directed to embodiments of the present invention, other and further embodiments of the invention may be devised without departing from the basic scope thereof, and the scope thereof is determined by the claims that follow.

The invention claimed is:

1. Apparatus for extending a zero voltage switching (ZVS) range during power conversion, comprising:
    a DC/DC converter, operated in a quasi-resonant mode, comprising:
        a transformer;
        a primary switch, coupled to a primary winding of the transformer, for controlling current flow through the primary winding; and
        a component coupled to the transformer, wherein the component has a capacitance that varies with voltage across the component, and wherein during a downswing in voltage across the primary switch the component is passively tuned by a change in the voltage across the component that changes the capacitance of the component, and wherein the passive tuning of the component causes a resonant frequency of the DC/DC converter to change, and wherein the change in the resonant frequency causes the downswing to accelerate.

2. The apparatus of claim 1, wherein the component is coupled to a secondary winding of the transformer.

3. The apparatus of claim 1, further comprising a voltage clamp circuit coupled across the primary switch for limiting the voltage across the primary switch, wherein the voltage clamp circuit comprises the component.

4. The apparatus of claim 1, wherein the DC/DC converter further comprises a diode and an output capacitor, wherein (i) an anode terminal of the diode is coupled to a first terminal of a secondary winding of the transformer and a first terminal of the component, (ii) a first terminal of the output capacitor is coupled to a cathode terminal of the diode, a second terminal of the component, and a first output terminal of the DC/DC converter, and (iii) a second terminal of the output capacitor is coupled to a second terminal of the secondary winding and a second output terminal of the DC/DC converter, wherein the first and the second output terminals of the DC/DC converter provide an output voltage.

5. The apparatus of claim 1, wherein the DC/DC converter further comprises an output capacitor, wherein (i) a first terminal of a secondary winding of the transformer is coupled to a first terminal of the component, (ii) a first terminal of the output capacitor is coupled to a second terminal of the component and a first output terminal of the DC/DC converter, and (iii) a second terminal of the output capacitor is coupled to a second terminal of the secondary winding and a second output terminal of the DC/DC converter, wherein the first and the second output terminals of the DC/DC converter provide an output voltage.

6. The apparatus of claim 1, wherein the DC/DC converter further comprises a diode, a capacitor, and a resistor, wherein (i) an anode terminal of the diode is coupled to a first terminal of the component and a drain terminal of the primary switch, (ii) a cathode terminal of the diode is coupled to a second terminal of the component, a first terminal of the capacitor, and a first terminal of the resistor, and (iii) a second terminal of the resistor is coupled to a second terminal of the capacitor and a source terminal of the primary switch.

7. The apparatus of claim 1, wherein the DC/DC converter further comprises a capacitor and a resistor, wherein (i) a first terminal of the component is coupled to a drain terminal of the primary switch, (ii) a second terminal of the component is coupled to a first terminal of the capacitor and a first terminal of the resistor, and (iii) a second terminal of the resistor is coupled to a second terminal of the capacitor and a source terminal of the primary switch.

8. A system for extending a zero voltage switching (ZVS) range during power conversion, comprising:
    a DC/DC converter for converting DC input power to DC output power, the DC/DC converter operated in a quasi-resonant mode and comprising:
        a transformer;
        a primary switch, coupled to a primary winding of the transformer, for controlling current flow through the primary winding; and
        a component coupled to the transformer, wherein the component has a capacitance that varies with voltage across the component, and wherein during a downswing in voltage across the primary switch the component is passively tuned by a change in the voltage across the component that changes the capacitance of the component, and wherein the passive tuning of the component causes a resonant frequency of the DC/DC converter to change, and wherein the change in the resonant frequency causes the downswing to accelerate; and
    a distributed generator (DG), coupled to the DC/DC converter, for providing the DC input power.

9. The system of claim 8, wherein the component is coupled to a secondary winding of the transformer.

10. The system of claim 8, further comprising a voltage clamp circuit coupled across the primary switch for limiting the voltage across the primary switch, wherein the voltage clamp circuit comprises the component.

11. The system of claim 8, wherein the DC/DC converter further comprises a diode and an output capacitor, wherein (i) an anode terminal of the diode is coupled to a first terminal of a secondary winding of the transformer and a first terminal of the component, (ii) a first terminal of the output capacitor is coupled to a cathode terminal of the diode, a second terminal of the component, and a first output terminal of the DC/DC converter, and (iii) a second terminal of the output capacitor is coupled to a second terminal of the secondary winding and a second output terminal of the DC/DC converter, wherein the first and the second output terminals of the DC/DC converter provide an output voltage.

12. The system of claim 8, wherein the DC/DC converter further comprises an output capacitor, wherein (i) a first terminal of a secondary winding of the transformer is coupled to a first terminal of the component, (ii) a first terminal of the output capacitor is coupled to a second terminal of the component and a first output terminal of the DC/DC converter, and (iii) a second terminal of the output capacitor is coupled to a second terminal of the secondary winding and a second output terminal of the DC/DC converter, wherein the first and the second output terminals of the DC/DC converter provide an output voltage.

13. The system of claim 8, wherein the DC/DC converter further comprises a diode, a capacitor, and a resistor, wherein (i) an anode terminal of the diode is coupled to a first terminal of the component and a drain terminal of the primary switch, (ii) a cathode terminal of the diode is coupled to a second terminal of the component, a first terminal of the capacitor, and a first terminal of the resistor, and (iii) a second terminal of the resistor is coupled to a second terminal of the capacitor and a source terminal of the primary switch.

14. The system of claim 8, wherein the DC/DC converter further comprises a capacitor and a resistor, wherein (i) a first terminal of the component is coupled to a drain terminal of the primary switch, (ii) a second terminal of the component is coupled to a first terminal of the capacitor and a first terminal of the resistor, and (iii) a second terminal of the resistor is coupled to a second terminal of the capacitor and a source terminal of the primary switch.

15. The system of claim 8, wherein the DG is a solar power generator.

16. The system of claim 8, further comprising a DC/AC conversion module coupled to the DC/DC converter for converting DC output power to an AC output power.

17. A method for extending a zero voltage switching (ZVS) range during power conversion, comprising:
  deactivating a primary switch of a DC/DC converter operating in quasi-resonant mode, the primary switch for controlling current flow through a primary winding of the DC/DC converter;
  increasing a resonant frequency of a resonant circuit of the DC/DC converter during a downswing in a voltage across the primary switch, wherein the resonant frequency is increased by passively tuning, during the downswing, a component coupled to a transformer of the DC/DC converter, wherein the component has a capacitance that varies with voltage across the component; and
  accelerating the downswing of the voltage across the primary switch as a result of increasing the resonant frequency by changing the voltage across the component to change the capacitance of the component.

18. The method of claim 17, wherein the component is coupled to a secondary winding of the transformer.

19. The method of claim 17, further comprising limiting a spike in the voltage across the primary switch, wherein the limiting is performed by a voltage clamp circuit coupled across the primary switch, wherein the voltage clamp circuit comprises the component.

20. The method of claim 17, wherein the DC/DC converter further comprises a diode and an output capacitor, wherein (i) an anode terminal of the diode is coupled to a first terminal of a secondary winding of the transformer and a first terminal of the component, (ii) a first terminal of the output capacitor is coupled to a cathode terminal of the diode, a second terminal of the component, and a first output terminal of the DC/DC converter, and (iii) a second terminal of the output capacitor is coupled to a second terminal of the secondary winding and a second output terminal of the DC/DC converter, wherein the first and the second output terminals of the DC/DC converter provide an output voltage.

* * * * *